UNITED STATES PATENT OFFICE.

CLAUS A. SPRECKELS AND CHARLES A. KERN, OF NEW YORK, N. Y., ASSIGNORS TO FEDERAL REFINING COMPANY, OF JERSEY CITY, NEW JERSEY, A CORPORATION OF NEW JERSEY.

PROCESS OF PURIFYING FLUID SUGAR-BEARING MATERIAL.

SPECIFICATION forming part of Letters Patent No. 699,933, dated May 13, 1902.

Application filed November 19, 1901. Serial No. 82,826. (No specimens.)

*To all whom it may concern:*

Be it known that we, CLAUS A. SPRECKELS and CHARLES A. KERN, citizens of the United States, and residents of the borough of Manhattan, city and State of New York, have invented certain new and useful Improvements in Purifying Fluid Sugar-Bearing Material, of which the following is a full and true description.

The object of this invention is to economically and quickly remove impurities from fluid sugar-bearing material, including molasses, sugar-juice, sugar liquor, sugar dissolved in water, and sugar-bearing material dissolved in water.

An invention for a somewhat similar purpose is the subject of an application, Serial No. 82,193, filed November 14, 1901, for Letters Patent for processes of purifying sugar or solutions thereof.

The present invention is for the treatment of sugar in solution by mixing with it a sulfonated fluid defecating or cleansing agent, preferably employing the agents and generic steps described in the aforesaid application.

Our present invention consists of the process of purifying or refining sugar which is in the form of fluid sugar-bearing material as distinguished from treating the sugar in solid or crystallized form. In general terms it may be described as practiced by mixing with the fluid sugar-bearing material a cleansing or defecating liquid, and which liquid has a greater affinity for the ordinary sugar impurities—such as earthy or metallic salts, invert sugar, and caramel—than the adherent properties of such impurities for the sugar itself. The liquid cleanser we prefer is a defecating or cleansing fluid containing or composed of a sulfonated body produced, as described in our application, Serial No. 82,193, aforesaid, by the action of sulfuric acid or mixture of acids containing sulfuric acid upon bodies— such as resins, rosin-oils, essential oils, fats, fatty oils, and fatty acids—in such proportions that there is no injurious effect upon the sugar from the sulfuric acid, and sulfonated fluid defecating or cleansing agents, including sulfonic acids or sulfonic-acid bodies, are produced, which have greater affinity or absorbent properties for the earthy or metallic salts and for the invert sugar and caramel ordinarily carried by sugar in solution than the adherent properties of such substances for the sugar itself, and then separating the purified sugar liquor from the defecating or cleansing liquid carrying the impurities.

We believe we are the first to discover the use, for the purpose of cleansing or purifying fluid sugar-bearing material, of defecating or cleansing sulfonated fluids, such as the recognized sulfonic acids or materials containing the same, having the characteristics and properties hereinbefore specified.

As an example of the way in which a sulfonated or sulfo-oleaginous body for use in fluid sugar-bearing materials may be prepared for use we have stated in our prior application, Serial No. 82,193, as follows: We mix sulfuric acid, preferably of 1.835 specific gravity, (66° Baumé,) or a mixture of acids containing sulfuric acid in the proportion of, say, fifty parts, by weight, of acid with one hundred parts, by weight, of one or more bodies, of which resinous bodies, fats, fatty oils and fatty acids, and essential oils are examples. The sulfuric acid is added to the body gradually, so as to maintain a low temperature, and the mixture is allowed to stand for a few hours. The excess of acid is removed or neutralized either by the addition of alkali or by the addition of water and gravital separation. The proportion and strength of acid above suggested may be used in sulfonating each and every one of the substances hereinafter mentioned; but in the cases of essential oils, such as turpentine, it will be preferable to considerably increase the proportion of the oil to the sulfuric acid, even to the extent of doubling the same or more. The cleansing or defecating body produced is of course in all cases fluid. We may add to the sulfonated body hydrocarbon oil or a mixture containing hydrocarbon oil.

The proportion and strength of acid may of course be varied in well-known ways, it being borne in mind that the result is that the body when acted upon by the sulfuric acid and in the condition in which it is to be used will not contain sulfuric acid in any amount injurious to the sugar and will have an affinity or absorbent property for the impurities greater than the adherent properties of such impurities for the sugar itself.

The following are bodies which we have tested and found to be acted upon and to act in the manner described, viz: colophonium, (rosin,) rosin-oil, olive-oil, castor-oil, cotton-seed oil, cocoanut-oil, linseed-oil, rape-oil, peanut-oil, lard, tallow, cod-liver oil, fish-oil, (menhaden-oil,) lard-oil, oleic acid, stearic acid, palmitic acid, butyric acid, oil of turpentine; but the substances above named are given as examples only of our invention.

Our invention also includes the employment of defecating or cleansing liquids made by the subjection of mixtures of two or more of such resinous, fatty, or oily bodies to the action of sulfuric acid or mixture of acids containing sulfuric acid. We have attained good results from a considerable number of such mixtures, of which the following may be cited as examples: first, rosin-oil, castor-oil, and oleic acid; second, castor-oil, cotton-seed oil, and oleic acid; third, lard and rosin-oil; fourth, rosin-oil, oleic acid, and oil of turpentine; fifth, tallow and oil of turpentine.

As most of the above-enumerated bodies are known as oils, and as rosin is analogous to the fatty bodies for the purposes of our invention, and as the fats are solid oils, and as the fatty acids, as is well known, have oily or greasy characteristics, and as all the above substances are acted upon by sulfuric acid in the manner described and also when sulfonated act on sugar and its impurities in analogous and equivalent ways, we hereinafter include them all under the generic term "oleaginous" bodies, and when acted on by sulfuric acid in the manner described we term the derivatives "sulfo-oleaginous" bodies. All the derivative cleansing agents mentioned are properly included also under the term "sulfonated" bodies, whether properly and strictly called "oleaginous" or not. Many forms of sulfo-oleaginous bodies, especially sulfonic acids or sulfonic-acid bodies, are well known in the arts for other purposes, and hence a more particular description of the methods of producing the same is not required.

The action of sulfuric acid upon the various resinous, fatty, or oily bodies, examples of which are above given, while not identical is sufficiently similar to class all of these bodies together for the reasons above specified, and a resulting substance or compound is produced which does not contain sulfuric acid in a form which is harmful to sugar, but which has an affinity or absorbent quality for the mineral or earthy salts and for the invert sugar and the caramel, which are the impurities most generally associated with sugar, superior to the adherence of such impurities to the sugar itself.

The exact character of the reaction produced by sulfuric acid on the bodies named differs, of course, somewhat with the character of the body treated; but the resulting product is for the purposes of this invention essentially the same in all cases.

We understand that the chemical reaction by which sulfonic acid is produced is said to be that one group of hydroxyl (H—O) of sulfuric acid is replaced by an organic group; but we do not limit ourselves to chemical formulæ, as in the case of many bodies these are obscure. Specific forms of immiscible defecating or cleansing liquids and the method of making the same are described and claimed in our pending application, Serial No. 82,825, filed November 19, 1901, for Letters Patent of the United States.

Our present invention as distinguished from the generic step claimed in our prior application, Serial No. 82,193, is based on the discovery made by us that certain defecating or cleansing liquids, especially sulfonated fluids, will not hold sugar in solution and will have greater affinity for the impurities, including the invert sugar, than the adherent properties of such impurities for the sugar itself and that the pure sugar liquor may be separated out in a refined state (more or less complete) by subjection to filtration. This process differs from that of treating the sugar in a solid or crystalline form in that the pure sugar liquor may by filtration be obtained at once freed from all kinds of impurities and from all traces of the composition, whereas when treating the sugar in an undissolved form with the cleansing composition and then separating out the composition and the absorbed impurities the solid substances—such as sticks, stones, fibers, straws, &c.—are at first left associated with the sugar, as are also sometimes traces of the cleansing composition, and in that case these have to be removed by further treatment. Our present method does or may by a simple process result in the separation of the sugar in a liquid form from all impurities and foreign bodies.

Our present process has, moreover, great advantages over other processes of filtration of sugar liquor, because by the preliminary mixing with the cleanser the impurities are caused to unite with the cleanser in preference to the sugar, the efficiency of the filtration is greatly increased, and the necessity for repeatedly passing the liquor through filters is done away with or greatly diminished.

Our new method, more fully described, consists in adding to the fluid sugar-bearing mass an immiscible defecating or cleansing liquid, especially one having the characteristics above described, and which when mixed therewith will so thoroughly combine with and act upon the impurities other than solids contained in the material treated and without injuriously affecting the sugar as to absorb out and retain when separated from the purified sugar all of the said impurities.

If any of the cleansing bodies utilized are in the form used at all soluble in water, they may nevertheless be readily availed of in connection with concentrated sugar solutions, as they are practically insoluble in such sugar solutions.

We prefer filtration to separate the purified sugar liquid from the mass containing the composition and the impurities absorbed out by it and the solid substances.

The mixture of the cleanser and fluid sugar-bearing material is stirred thoroughly in order to bring the cleanser into intimate contact with all of the impurities of the sugar. The amount of cleanser may be varied to suit the different qualities of the material being treated. In all cases there should preferably be more than enough to absorb out the impurities. As the cleanser has no injurious effect upon the sugar, the quantity of cleanser may be increased as desired.

If the solution is at all acid, it may be neutralized by the addition of a little slaked lime. The separation of all traces of the cleansing body from the sugar liquor may be hastened and rendered more complete if we add before such filtration fullers' earth or substitute, the action of which may be assisted by the addition of metallic oxid, metallic hydroxid—for instance, slaked lime or metallic salt or mixture of the same. This form of process of separation, which is especially described and claimed in an application filed April 22, 1902, Serial No. 104,115, results in the separation of the purified sugar liquor from the sugar solution by reason of the fact that the defecating or cleansing agent, especially a sulfo-oleaginous cleansing liquid having a greater affinity for the impurities of the sugar solution, including invert sugar, than the adherent properties of such impurities for the sugar itself, seizes or retains the impurities, and the fullers' earth or substitute, among other things, thickens the mixture and engages with and holds the cleanser and impurities, thickening the cleanser so as to be retained by the filtrant or filter-bed.

The treatment of the material by the liquid cleanser is preferably carried out without the application of heat, inasmuch as then there is no tendency to the formation of caramel or invert sugar during the treatment.

The refined sugar liquor obtained as above described may be subjected to any desired subsequent process for crystallization. The residuum remaining in the filter may be treated for the recovery of our composition, the fullers' earth, and any salts that may have been added.

We desire it clearly understood that while we specify certain substances and mixtures thereof as producing the composition and results above described, yet we do not limit ourselves to the substances and mixtures specifically mentioned.

We claim—

1. The process of treatment of sugar, which consists in mixing with a sugar solution a defecating or cleansing liquid containing a sulfonated body and then separating said liquid and the impurities from the solution, substantially as described.

2. The process of treatment of sugar, which consists in mixing with a sugar solution a sulfo-oleaginous body, and then separating the sulfo-oleaginous body and impurities from the solution, substantially as described.

3. The process of treatment of sugar, which consists in mixing with a sugar solution a sulfonic-acid body, and then separating the sulfonic-acid body and impurities from the solution, substantially as described.

4. The process of treatment of sugar, which consists in mixing with a sugar solution a sulfonated derivative of a resinous body, and then separating said derivative and the impurities from the solution, substantially as described.

CLAUS A. SPRECKELS.
CHARLES A. KERN.

Witnesses:
WILLIAM W. COOK,
W. H. BERRIGAN, Jr.